Jan. 25, 1949.　　　　M. L. ROARK　　　　2,459,963
FISHING LINE CHANGER
Filed May 12, 1947
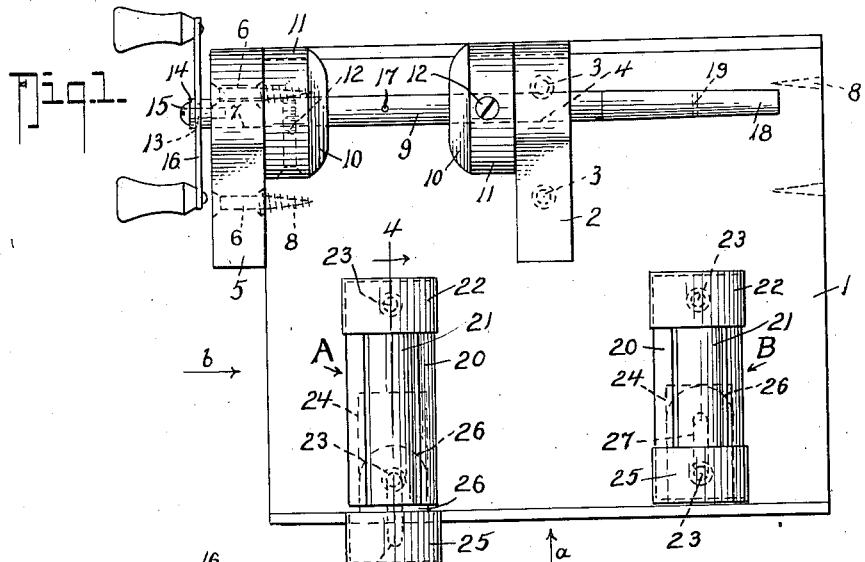
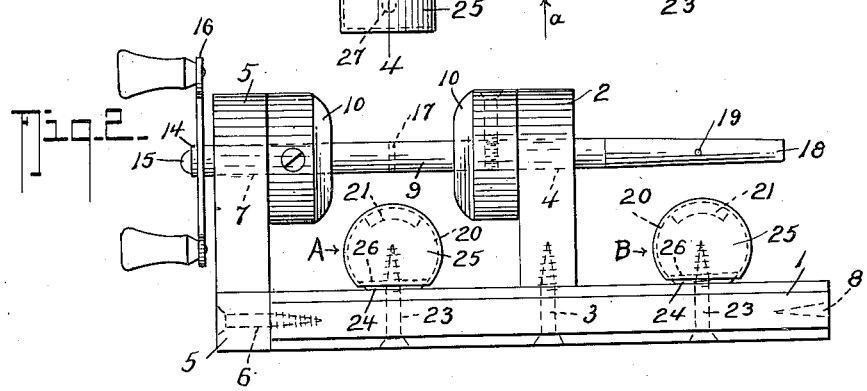
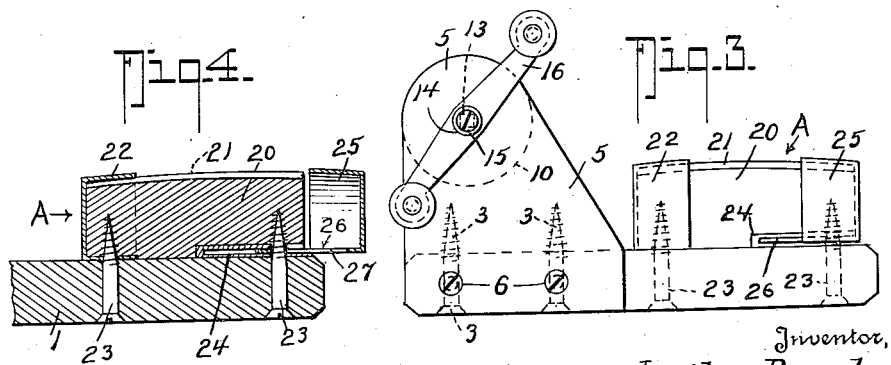
Inventor,
Martin Luther Roark,
By Albert E. Dieterich,
Attorney.

Patented Jan. 25, 1949

2,459,963

UNITED STATES PATENT OFFICE 2,459,963

FISHING LINE CHANGER

Martin Luther Roark, Elizabethton, Tenn.

Application May 12, 1947, Serial No. 747,522

5 Claims. (Cl. 242—85)

My invention relates to fishermen's appliances and especially to devices for changing the fishing line on a fishing reel.

Primarily the invention has for its object to provide a simple, inexpensive apparatus for the purpose stated which can be used by either right-handed or left-handed fishermen to wind off an old line from a fishing reel and wind a new line on the same.

A further object is to provide an apparatus of the above character which can be carried in a fisherman's tackle and tool box.

Another object is to provide apparatus of the character stated which can be manufactured at low cost and sold within the means of most fishermen.

To the attainment of the aforesaid objects and ends invention resides in the novel features of the construction, combinations and arrangements of parts which will first be fully described and then be specifically pointed out in the appended claims, reference being had to the accompanying drawing in which:

Fig. 1 is a top plan view of my apparatus set up for a right-handed fisherman.

Fig. 2 is an elevation of the same looking in the direction of the arrow $a$ in Fig. 1.

Fig. 3 is an elevation of the same looking in the direction of the arrow $b$ in Fig. 1.

Fig. 4 is a detail section on the line 4—4 of Fig. 1.

In the drawing in which like numerals and letters of reference indicate like parts in all the figures, 1 represents the base of the apparatus. Mounted midway of the right and left-hand sides of the base is a support 2 that is secured to the base in any approved way, as by screws 3. The support 2 has a bearing aperture 4 for a winding shaft 9 later again mentioned.

Detachably secured to one side or other (depending on whether the apparatus is to be used by a right-hand or left-hand fisherman) of the base 1 is a second support 5. The support 5 is secured by screws 6 and has a bearing aperture 7 which is in alignment with aperture 4 to receive the shaft 9. The base 1 has screw-receiving recesses 8 at each side to receive the screws 6. The shaft 9 has a pair of drum flanges 10 which are spaced apart and between which a fishing line (not shown) can be wound on the shaft. The flanges 10 are spaced from the supports 2 and 5 by suitable collars 11 secured to the shaft by screws 12. The outer end of the shaft 9 is squared, as at 13, to receive a conventional reel handle 16 which is held in place by a screw 15 and washer 14.

The shaft 9 has a small hole 17 located between the flanges 10. It also has a slightly tapered end 18 through which is drilled a small hole 19.

A and B represent a pair of reel holders one of which is located in line with the hole 17 and the other in line with the hole 19. Each holder A, B, comprises a generally cylindrical body 20 having a longitudinal recess 21 shaped to receive the usual mounting plate (not shown) of a fishing reel.

A permanently located reel-holder cap 22 is secured to one end of the body 20 by a fastening screw 23, a second screw 23 serving to hold the other end of the body 20 to the base. The body 20 has a slide way 24 in which operates the mounting plate 26 of a movable reel-holder cap 25, the plate 26 being slotted, as at 27, to pass the last mentioned screw 23 which acts as a stop for the cap 25.

The drum flanges 10 may be made integral with the shaft 9 or integral with the collars 11 as may be found most desirable.

Operation

To change the line on a reel, the fishing reel is first placed in reel holder A and cap 25 is pushed over the mounting plate of the reel to hold it in place. The loose line and from the reel is passed through hole 17 and shaft 9 is then turned to wind the line on the shaft between the flanges 10. After the line has been removed from the fishing reel, the reel is then transferred to reel holder B. The spool containing the new or desired line is then pushed onto the end 18. The loose end of the new line is tied to the drum of the reel and the reel cranked to wind the new line on the same.

The apparatus may be made of any suitable material desired.

If the apparatus is to be used by a left-handed fisherman, support 5 is unscrewed, handle 16 disconnected and shaft 9 withdrawn from its bearings 4 and 7. Support 5 is then secured to the opposite side (right-hand side in Fig. 1) with shaft 9 reversed in its bearings 2 and 7. When so set up reel holder B is first used for unwinding purposes and holder A is then used for new line winding purposes.

From the foregoing description taken in connection with the accompanying drawing it is thought the construction, operation and advantages of my apparatus will be clear to those skilled in the art to which it relates.

What I claim is:

1. In apparatus of the class described a base, a support mounted on the base midway between opposite sides of the base, a second support mounted on one of said sides, said supports having aligning shaft bearings, a shaft rotatably mounted in said bearings and one end of said shaft extending beyond the first mentioned support to receive a line-carrying-spool, a crank on the other end of said shaft, spaced apart drum flanges on the portion of said shaft which lies between said supports, a reel holder mounted on said base in a position in line with the space between the drum flanges, and a second reel holder mounted on said base in transverse alignment with the extended end of said shaft.

2. An apparatus according to claim 1 wherein the base has provisions whereby the second mentioned support can be interchangeably mounted on either side as desired.

3. An apparatus according to claim 1 wherein the shaft between the flanges has a line-receiving hole.

4. An apparatus according to claim 1 wherein the base has provisions whereby the second mentioned support can be interchangeably mounted on either side as desired and wherein said extended end of the shaft is tapered to receive and retain by friction a line spool.

5. In apparatus of the class described, a base, two spaced-apart supports mounted on the base and having aligned shaft bearings, a shaft rotatably mounted in said bearings, spaced-apart drum flanges on said shaft located between said supports, one end of said shaft projecting beyond one of its supports and over a portion of the base to receive a line spool, means to detachably mount a fishing reel on said base in position to have its line unreeled from the fishing reel onto said shaft, and other means on said base to detachably mount a fishing reel in position to receive the line from a line spool when such spool is located on said one end of said shaft.

MARTIN LUTHER ROARK.

REFERENCES CITED

The following references are of record in the file of this patent:

UNITED STATES PATENTS

| Number | Name | Date |
|---|---|---|
| 1,366,340 | Anderson | Jan. 25, 1921 |
| 1,836,815 | Reeves | Dec. 15, 1931 |
| 1,902,611 | Blackman et al. | Mar. 21, 1933 |
| 1,971,000 | Field | Aug. 21, 1934 |
| 2,221,543 | Johannessen | Nov. 12, 1940 |